United States Patent
Leicht

(10) Patent No.: US 6,558,587 B1
(45) Date of Patent: May 6, 2003

(54) IN SITU LOW PRESSURE GASKET MOLDING METHOD

(75) Inventor: Larry F. Leicht, Hurst, TX (US)

(73) Assignee: O'SO, Inc., Saginow, TX (US)

( * ) Notice: Subject to any disclaimer, the term of this patent is extended or adjusted under 35 U.S.C. 154(b) by 0 days.

(21) Appl. No.: 09/397,483

(22) Filed: Sep. 16, 1999

Related U.S. Application Data

(60) Provisional application No. 60/120,943, filed on Feb. 19, 1999, now abandoned.

(51) Int. Cl.$^7$ ................. B29C 45/14; B29C 70/80; B29C 70/84
(52) U.S. Cl. ................. 264/39; 264/250; 264/268; 264/275
(58) Field of Search ................. 264/250, 255, 264/259, 268, 267, 275, 39

(56) References Cited

U.S. PATENT DOCUMENTS

| | | | |
|---|---|---|---|
| 3,061,321 A | | 10/1962 | Smith ................. 277/180 |
| 4,155,478 A | * | 5/1979 | Ogi ................. 264/263 |
| 4,214,507 A | * | 7/1980 | Hock et al. ................. 264/250 |
| 4,261,947 A | * | 4/1981 | Ogi ................. 264/263 |
| 4,321,225 A | | 3/1982 | Jelinek ................. 264/138 |
| 4,439,600 A | | 3/1984 | Moran, Jr. |
| 4,582,551 A | | 4/1986 | Parkes et al. |
| 4,673,449 A | | 6/1987 | Webb et al. |
| 4,677,133 A | | 6/1987 | Leicht |
| 4,764,535 A | | 8/1988 | Leicht |
| 4,772,031 A | | 9/1988 | Poppo |
| 5,008,060 A | * | 4/1991 | Kanai et al. ................. 264/255 |
| 5,116,558 A | | 5/1992 | Wrobel et al. |
| 5,160,474 A | * | 11/1992 | Huff ................. 264/255 |
| 5,164,136 A | * | 11/1992 | Comert et al. ................. 264/267 |
| 5,193,264 A | | 3/1993 | Brown |
| 5,246,065 A | * | 9/1993 | Huff ................. 165/173 |
| 5,851,472 A | * | 12/1998 | Kashiyama ................. 264/268 |
| 6,238,610 B1 | * | 5/2001 | Yamazaki et al. ................. 264/267 |

FOREIGN PATENT DOCUMENTS

| | | |
|---|---|---|
| CA | 1285697 | 7/1991 |
| EP | 0 846 853 A1 | 6/1998 |

* cited by examiner

Primary Examiner—Angela Ortiz
(74) Attorney, Agent, or Firm—Jenkens & Gilchrist, P.C.

(57) ABSTRACT

Disclosed is a method for forming a gasket seal or transition fitting affixed to one of two parts to be joined in a gasketed joint by use of the gasket. The method includes the step of providing a mold having a walled mold cavity of the shape desired for the gasket, at least one wall of the mold cavity being a junction surface of the one part and the remaining walls of the mold cavity being formed in a mold piece. The mold is closed by placing the mold piece over the junction surface of the one part to establish the mold cavity as a closed generally toroidal volume. Then a molten gasket-forming thermoplastic material is injected into the mold cavity to form the gasket, the thermoplastic material including a bonding agent for establishing an adhesive bond between the junction surface and the gasket. The thermoplastic material is cooled to solidify the gasket and affix it to the junction surface and the mold piece is removed away from the junction surface.

6 Claims, 1 Drawing Sheet

IN SITU LOW PRESSURE GASKET MOLDING METHOD

This application claims the benefit of Provisional Patent Application No. 60/120,943 filed Feb. 19, 1999, entitled MOLDED GASKETING SYSTEM AND METHOD, now abandoned, and is a Continuation-in-Part thereof.

TECHNICAL FIELD OF THE INVENTION

This invention relates to a method for producing gaskets, seals or transition fittings which are integral to the part to which they are applied. This invention also relates to elastomer compositions, and more particularly to single or multi-component elastomer compositions and their use in forming gaskets, seals or transition fittings.

BACKGROUND OF THE INVENTION

In many kinds of equipment, ducting, piping, castings, and other parts are joined together in gasketed joints in order to form gas, liquid, electrical, chemical, or sound isolation seals at the joints. The common method of making gasketed joints involves separately forming a gasket, positioning it, usually by hand, on the flange or other junction surface of one or more of the parts, attaching the gasket to one or the other of the parts by adhesive or mechanical fasteners and then bolting or otherwise fastening the two parts forming the joint together. These procedures are labor intensive and require multiple handling of parts, together with multiple needs for quality and operability inspections. Typically handling and inspections are required through three tiers of manufacturing: during production of the materials, forming of the parts, and fabrication of the assembly structure.

There is a need to be able to form or mold a gasket in place on one (or more) of the parts that is to be connected at the gasketed joint and also to form it more or less integrally with one of the parts if desired. The present invention meets that need, both for foamed gaskets and for solid or hard gaskets. It is particularly useful in the construction of molded in place gaskets for polypropylene parts.

SUMMARY OF THE INVENTION

In accordance with a principal aspect of the present invention, a method for molding the gasket, seal or transition part directly on a part is disclosed. As best illustrated by the figures described more fully below, it can be seen that a part having a bonding surface or flange is mated with a mold which is then clamped around the part, thus creating a sealed mold cavity that is generally toroidal in shape, and in which the bonding surface or flange of the part forms one or more walls of the mold. Gasket or sealant material containing a bonding agent or being otherwise rendered capable of bonding to the bonding surface is then injected into the mold cavity in molten or flowable condition. Upon solidifying, it bonds directly to the part. This eliminates the need for a separate step in which a bead of adhesive is applied to the bonding surface or flange, and then an already fabricated gasket is positioned on the surface, which is the common prior art procedure. By carefully selecting the bonding agent which is placed in the gasket or seal material, it is possible to assure that upon opening the mold, the gasket material will remain adhered to the bonding surface of the part and release cleanly from the mold. Additionally, the mold may be treated with a suitable release agent, such as a silicone release agent which is applied to the surfaces of the mold but not to the bonding surface.

Yet a further aspect of the present invention includes the application of a slip coat material to the mold which may, for example, be comprised of a water-based polyurethane. The purpose of the slip coat is to form a skin on the outer or non-bonding surfaces of the gasket. This is particularly useful in that it creates a non-tackified surface on the exterior of the gasket and effectively kills the activity of the bonding agent at these surfaces. This feature is particularly important in gasket applications where surfaces of parts made of the same materials may be joined at the gasket, but it is desirable to be able to separate them later without damaging the parts or the gasket.

In accordance another important aspect of the present invention, there is provided a new and improved elastomer composition which may be subjected to a foamed extrusion procedure to produce an elastomeric cellular product preferably in the course of which a gasket is formed. The elastomer composition of the present invention comprises a mixture of at least one thermoplastic rubber compound and a bonding agent. The at least one thermoplastic rubber compound may further comprise a mixture of two thermoplastic rubber compounds as disclosed in U.S. Pat. No. 4,677,133 issued to Leicht and U.S. Pat. No. 4,764,535 issued to Leicht, the disclosures of which are incorporated herein by reference in their entirety for all purposes.

The bonding agent may comprise one or more of any number of polymeric adhesives which are suitable for bonding the gasket or seal to a part which has already been fabricated and cooled. The bonding agent will typically comprise less than 30% by weight (5% wt. is preferable) of the mixture used to create the gasket or seal. The bonding agents which may be incorporated into the gasket material may best be illustrated by, but not limited to, several examples. If the part to which the gasket is to be bonded is formed of nylon, an acrylic bonding agent may be used. If the part to be bonded to is formed of polyethylene, it is preferred to use a hydrocarbon resin as a bonding agent. If the part to be bonded to is formed of polypropylene, then the bonding agent is preferably formed of a blend of isotactic polypropylene, atactic polypropylene and low molecular weight polyamide. Specifically, a polypropylene bonding agent may comprise approximately 5–50% fatty acid dimer based polyamide, commonly used as a curing agent for epoxy, with the balance comprising isotactic and atactic polypropylenes in a ratio ranging from 1:1 to 1:10 with a ratio of 1:5.5 being preferable.

In further accordance with the invention, a method for forming a gasket affixed to one of two parts to be joined in a gasketed joint by use of the gasket is provided. The method includes providing a mold having a walled mold cavity of the shape desired for the gasket, at least one wall of the mold cavity being a junction surface of the one part and the remaining walls of the mold cavity being formed in a mold piece. A release agent may be applied to the walls of the mold cavity except for the junction surface. The mold is closed by placing the mold piece over the junction surface of the one part to establish the mold cavity as a closed generally toroidal volume into which is injected a molten gasket-forming thermoplastic material to form the gasket. The thermoplastic material includes a bonding agent for establishing an adhesive bond between the junction surface as the gasket thermoplastic material is cooled to solidify the gasket and affix it to the junction surface. The mold piece is then removed away from the junction surface, and the part, with gasket affixed in place is ready for connection with the other part.

The method may also include coating the walls of the wall cavity other than the junction surface with a slip coat material after applying the release agent and before closing the mold. The slip coat material acts to form a skin on the surfaces of the gasket being formed other than the surface adjacent the junction surface.

In the practice of the foregoing methods, one part may be formed of polypropylene with the bonding agent comprising from about 5 to about 50 percent fatty acid dimer based on polyamide and the balance comprising isotactic and atactic polypropylenes in a ratio between about 1:1 and about 1:10, with bonding agent comprising less than about 30 percent of the gasket forming thermoplastic material.

Furthermore, the one part may be formed of nylon and the bonding agent may be an acrylic material comprising less than about 30 percent of the gasket forming thermoplastic material.

Also, the foregoing methods may be practiced with one part formed of polyethylene and the bonding agent being a hydrocarbon resin comprising less than about 30 percent of the gasket forming thermoplastic material.

Silicone is the preferred release agent in the practice of the foregoing method, and a slip coat material is a water-based polyurethane.

In a preferred form of the invention an elastomer composition adapted for use in forming gaskets affixed to one of two parts joined together in a gasketed joint includes at least one thermoplastic rubber material and a bonding agent capable of bonding the composition to the material from which the one part is formed upon solidification of the composition from the melt. An elastomer composition especially suited for use in forming gaskets affixed to polypropylene parts is one in which the bonding agent comprises from about 5 to about 50 percent fatty acid dimer based on polyamide and the balance comprise isotactic and atactic polypropylenes in a ratio between about 1:1 and about 1:10, the bonding agent comprising less than about 30 percent of said composition. An elastomer composition especially suited for use in forming gaskets affixed to nylon parts is one in which said bonding agent is an acrylic material comprising less than about 30 percent of said composition. Furthermore, an elastomer composition especially suited for use in forming gaskets affixed to polyethylene parts is one in which the bonding agent is a hydrocarbon resin comprising less than about 30 percent of the composition.

DESCRIPTION OF THE PREFERRED EMBODIMENTS

Figure 1:
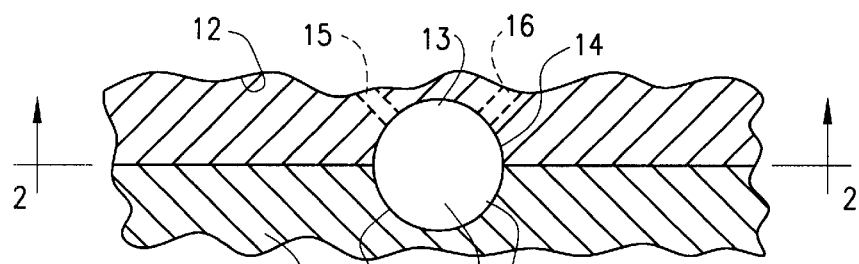
FIG. 1 is a diagrammatic cross-sectional illustration of a gasket-receiving part having a bonding surface or flange with a mold piece mated with it, the view being taken on the line 1—1 of FIG. 2.

Attention is first directed to FIG. 1 which shows a gasket-receiving part 10 in sectional elevation. For clarity part 10 is cross-hatched as metal, but it should be understood it may be formed of plastic or other materials. The part 10 has a groove in it 11 having the desired shape of the part of the gasket which is to be adhered to part 10 upon formation of the gasket. Mated with part 10 is mold piece 12 also shown in fragmentary elevational cross-section. It, too, is cross-hatched as metal although it may be plastic or other materials. Mold 12 has a groove 13 having walls 14 to define the remainder of the gasket forming walls of the mold piece.

Figure 2:
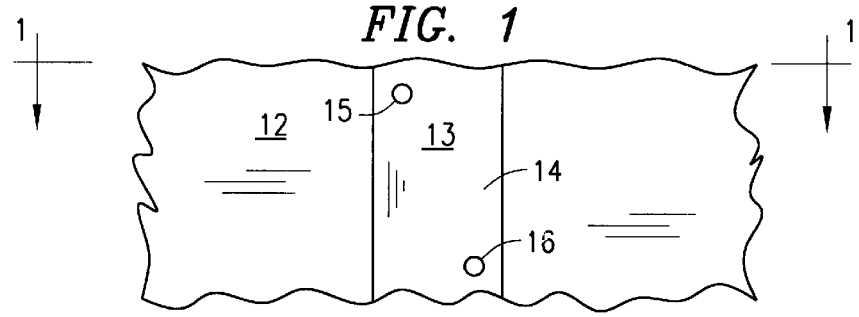
FIG. 2 is a diagrammatic fragmentary plan view of the underside of the mold piece shown in FIG. 1, the view being taken on the line 2—2 of FIG. 1.

The mold piece is shown in an upward looking plan view in FIG. 2, which best shows the inlet opening 15 and the vent 16 with which the mold piece is provided.

It can thus be seen from FIGS. 1 and 2 that the gasket receiving part 10, and the mold piece 12 define a closed cavity 17 which is a mold cavity having at least one wall 18 which is formed by the gasket-receiving piece itself. The mold cavity is arranged in the form of a closed loop which may be said to be generally toroidal, although it may have an irregular closed loop shape to meet the gasketing requirements of the system.

Figure 3:
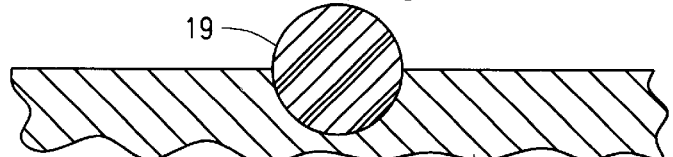
FIG. 3 is a diagrammatic fragmentary cross-sectional elevational view of the gasket-receiving part, with a gasket molded thereon.

In operation, the mold piece 12 is preferably coated with a release agent on the wails of the mold cavity. Mold piece 12 is then positioned over and clamped to or held against gasket-receiving part 10 with the groove in the gasket-receiving part 10 and the groove in the mold piece 12 in registry to form a mold cavity as shown in FIG. 1. Molten thermoplastic material is then introduced to the mold cavity through port 15, and the atmosphere in the mold cavity is progressively evacuated ahead of the flowing gasket material through vent 16. Sufficient molten thermoplastic material is injected to place enough material in the closed loop mold cavity to fill it entirely, so that a continuous gasket is formed. The mold and mold piece 12 and part 10 are then cooled to permit the thermoplastic material in the mold cavity to harden or solidify, and when the gasket is sufficiently solidified, the mold piece 12 is removed, and the gasket is left in place as shown in FIG. 3 where it is indicated at 19. If it is desired, a slip coat material may be applied to the walls of the mold piece 12 forming the cavity after application of the before mentioned release agent, and before closing the mold. The slip coat material acts to form a skin on the surface of the gasket being formed. This creates a non-tackified surface on the exterior of the gasket and effectively kills the activity of the bonding agent at the exterior surfaces. This is important in gaskets where the surfaces of parts made of the same materials may be joined at the gasket but it is desirable to be able to separate them later without damaging either the parts or the gasket.

Figure 4:
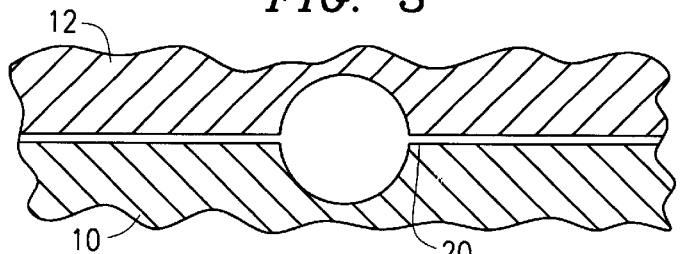
FIG. 4 is a view similar to FIG. 1 of a gasket-receiving part and mold piece arranged for purposeful formation of a zone of flash along the sides of the gasket to increase the adherence of the gasket.

FIG. 4 is similar to the FIG. 1 but it shows an arrangement in which a small gap 20 of controlled and chosen dimension is established between the mold piece 12 and the gasket-receiving part 10. When gasket forming material is introduced into the mold cavity in this arrangement, some of it flows out into the gap for some distance determined by the cooling conditions of the material.

Figure 5:
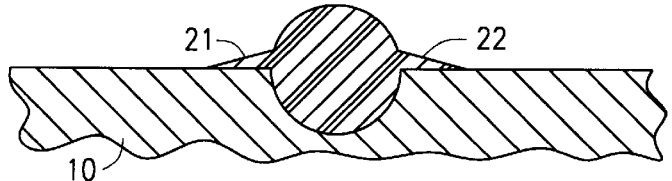
FIG. 5 is a view similar to FIG. 3 showing a gasket formed on the gasket-receiving part from the equipment as arranged in FIG. 4.

A finished gasket produced in the equipment shown in FIG. 4 is shown in FIG. 5 where it appears that the formed gasket includes flashed areas 21 and 22. These serve to increase the area of adhesion between the gasket and the gasket-receiving part 10.

Figure 6:
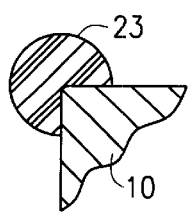
FIGS. 6, 7, 8 and 9 are fragmentary elevational views, partly in section, showing various possible arrangements and shapes of gaskets formed in accordance with the invention on gasket-receiving parts.
Figure 7:
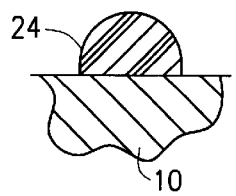
Figure 8:
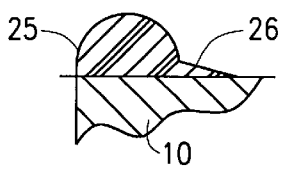
Figure 9:
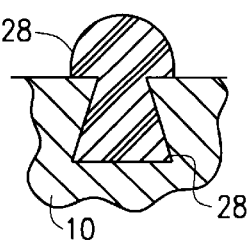

FIGS. 6, 7, 8 and 9, taken together, illustrate the great flexibility of design which is made possible in accordance with the invention. The flexibility includes both flexibility in the shape of the gasket-receiving part 10 in the vicinity of the gasket and flexibility in the shape of the gasket itself. Thus, gasket 23 in FIG. 6 is formed at and adhered to the corner of a gasket-receiving part. Gasket 24 in FIG. 7 is adhered to a substantially planar surface of a gasket-receiving part 10. Gasket 25 in FIG. 8 is formed at the edge of a gasket-receiving part and the gasket is also provided with a flash area 26 for increasing the adhesion area. In FIG. 9 the gasket holding groove 27 on the gasket receiving part 10 is mitered so that the bottom portion of the gasket 28 is physically anchored in the groove 27 as well as being adhered thereto.

From the foregoing, it can be seen that in accordance with the invention, a gasket molding method and technique is provided which has great flexibility in design and which eliminates much manual handling of gaskets and the problems and costs involved therein.

What is claimed is:

1. A method for forming a gasket seal or transition fitting affixed to one of two parts to be joined in a gasketed joint by use of said gasket comprising:

providing a mold having a walled mold cavity of the shape desired for said gasket, at least one wall of said mold cavity adjacent a junction surface of said one part and the remaining walls of said mold cavity being formed in a mold piece;

closing said mold by placing said mold piece over said junction surface of said one part to establish said mold cavity as a closed generally toroidal volume;

injecting a molten gasket forming thermoplastic material into said mold cavity to form said gasket, said thermoplastic material including a bonding agent comprised of polymeric adhesive for establishing an adhesive bond between said junction surface and said gasket;

cooling said thermoplastic material to solidify said gasket and affix it to said junction surface;

removing said mold piece away from said junction surface;

applying a release agent to the walls of said mold cavity other than said junction surface prior to closing said mold; and coating the walls of said mold cavity other than said junction surface with a slip coat material after applying said release agent and before closing said mold, said slip coat material acting to form a skin on the surfaces of the gasket being formed other than the surface adjacent said junction surface.

2. A method for forming a gasket seal or transition fitting affixed to one of two parts to be joined in a gasketed joint by use of said gasket comprising:

providing a mold having a walled mold cavity of the shape desired for said gasket, at least one wall of said mold cavity adjacent a junction surface of said one part and the remaining walls of said mold cavity being formed in a mold piece;

closing said mold by placing said mold piece over said junction surface of said one part to establish said mold cavity as a closed generally toroidal volume;

injecting a molten gasket forming thermoplastic material into said mold cavity to form said gasket, said thermoplastic material including a bonding agent comprised of polymeric adhesive for establishing an adhesive bond between said junction surface and said gasket;

cooling said thermoplastic material to solidify said gasket and affix it to said junction surface;

removing said mold piece away from said junction surface; and wherein said one part is formed of polypropylene and said bonding agent comprises from about 5 to about 50 percent fatty acid dimer based on polyamide and the balance comprises isotactic and atactic polypropylenes in a ratio between about 1:1 and about 1:10, said bonding agent comprising less than about 30 percent of said gasket forming thermoplastic material.

3. A method for forming a gasket seal or transition fitting affixed to one of two parts to be joined in a gasketed joint by use of said gasket comprising:

providing a mold having a walled mold cavity of the shape desired for said gasket, at least one wall of said mold cavity adjacent a junction surface of said one part and the remaining walls of said mold cavity being formed in a mold piece;

closing said mold by placing said mold piece over said junction surface of said one part to establish said mold cavity as a closed generally toroidal volume;

injecting a molten gasket forming thermoplastic material into said mold cavity to form said gasket, said thermoplastic material including a bonding agent comprised of polymeric adhesive for establishing an adhesive bond between said junction surface and said gasket;

cooling said thermoplastic material to solidify said gasket and affix it to said junction surface;

removing said mold piece away from said junction surface; and wherein said one part is formed of nylon and said bonding agent is an acrylic material comprising less than about 30 percent of said gasket forming thermoplastic material.

4. A method for forming a gasket seal or transition fitting affixed to one of two parts to be joined in a gasketed joint by use of said gasket comprising:

providing a mold having a walled mold cavity of the shape desired for said gasket, at least one wall of said mold cavity adjacent a junction surface of said one part and the remaining walls of said mold cavity being formed in a mold piece;

closing said mold by placing said mold piece over said junction surface of said one part to establish said mold cavity as a closed generally toroidal volume;

injecting a molten gasket forming thermoplastic material into said mold cavity to form said gasket, said thermoplastic material including a bonding agent comprised of polymeric adhesive for establishing an adhesive bond between said junction surface and said gasket;

cooling said thermoplastic material to solidify said gasket and affix it to said junction surface;

removing said mold piece away from said junction surface; and wherein said one part is formed of polyethylene and said bonding agent is a hydrocarbon resin comprising less than about 30 percent of said gasket forming thermoplastic material.

5. A method in accordance with claim 1 in which said slip coat material comprises a water-based polyurethane.

6. A method for forming a gasket seal or transition fitting affixed to one of two parts to be joined in a gasketed joint by use of said gasket comprising:

providing a mold having a walled mold cavity of the shape desired for said gasket, at least one wall of said mold cavity adjacent a junction surface of said one part and the remaining walls of said mold cavity being formed in a mold piece;

closing said mold by placing said mold piece over said junction surface of said one part to establish said mold cavity as a closed generally toroidal volume;

injecting a molten gasket forming thermoplastic material into said mold cavity to form said gasket, said thermoplastic material including a bonding agent comprised of polymeric adhesive for establishing an adhesive bond between said junction surface and said gasket;

cooling said thermoplastic material to solidify said gasket and affix it to said junction surface; and removing said mold piece away from said junction surface;

wherein a gap is formed between said wall of said mold cavity and said junction surface and molten thermoplastic material is introduced into said gap in the course of forming said gasket to make an area of flashing at an edge of said gasket.

* * * * *

UNITED STATES PATENT AND TRADEMARK OFFICE
CERTIFICATE OF CORRECTION

PATENT NO. : 6,558,587 B1  
DATED : May 6, 2003  
INVENTOR(S) : Larry Leicht

It is certified that error appears in the above-identified patent and that said Letters Patent is hereby corrected as shown below:

<u>Title page,</u>
Item [73], Assignee, please delete "O'So, Inc., Saginow, TX (US)" and replace with
-- Q'So, Inc., Saginaw, TX (US). --

<u>Drawings,</u>
Figure 9, please delete "28" in lower right hand corner and replace with -- 2 --.

<u>Column 4,</u>
Line 26, please delete "wails" and replace with -- walls --.

Signed and Sealed this

Fourth Day of May, 2004

JON W. DUDAS
*Acting Director of the United States Patent and Trademark Office*